No. 884,521. PATENTED APR. 14, 1908.
R. E. PATTERSON.
ROPE GRIP.
APPLICATION FILED DEC. 22, 1906.

Inventor
Raymond E. Patterson,

Witnesses
Frank Hough
C. C. Hines

By Victor J. Evans
Attorney

UNITED STATES PATENT OFFICE.

RAYMOND E. PATTERSON, OF ROCHESTER, NEW YORK.

ROPE-GRIP.

No. 884,521.     Specification of Letters Patent.     Patented April 14, 1908.

Application filed December 22, 1906. Serial No. 349,159.

*To all whom it may concern:*

Be it known that I, RAYMOND E. PATTERSON, a citizen of the United States of America, residing at Rochester, in the county of Monroe and State of New York, have invented new and useful Improvements in Rope-Grips, of which the following is a specification.

This invention relates to rope grips, being primarily designed to provide a simple, cheap and effective grip for attaching a connecting member to a rope in such a manner as to permit a quick adjustment thereof along the rope, the construction of the grip being such as to adapt it to bind with increasing force upon the rope proportionately to the pulling or resistance strain of the connecting member, whereby slipping of the grip upon the rope will be prevented and a firm and secure connection afforded.

Figure 2:
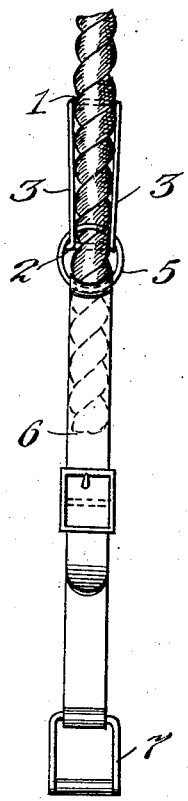
Figure 1:
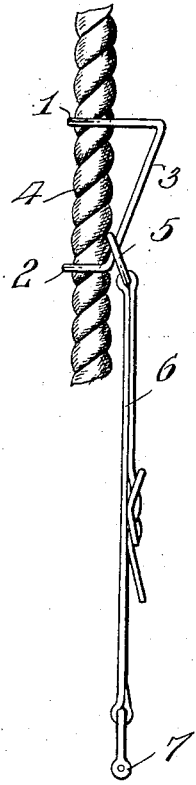
Figure 3:
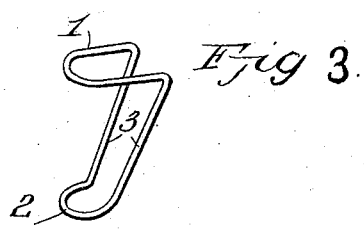

In the accompanying drawing, Figure 1 is a side elevation, showing the application of the invention. Fig. 2 is a front elevation of the same. Fig. 3 is a perspective view of the grip detached.

The grip is preferably formed of wire properly bent into shape, the material of which it is formed being bent to form terminal parallel loops 1 and 2 and intermediate connecting arms 3. The loop 1 is of greater length than the loop 2, preferably being in practice in the proportion of two to one, the outer or closed ends of the loops being disposed in the same plane. The terminals of the arms of the loop 1 and the terminals of the arms of the loop 2 are spaced apart sufficiently at the open ends of said loops to freely receive a rope 4 of a prescribed diameter, and are connected by the arms 3, which are thus obliquely arranged to the longitudinal central line or axis of the grip.

A ring or link 5 is slidably mounted on the arms 3 and is attached to the connecting member 6, which may be in the form of a pull strap having an operating handle 7, or in the form of any other suitable connection designed to be adjustably connected with the rope. Under the pull upon the strap 6 the link 5 which lies between the rope and lower ends of the arms 3 will pull upon the eye 2 and at the same time exert outward and downward pressure upon the oblique arms 3, whereby the loop 1 will be drawn into engagement with the rope, thus causing the grip to be firmly held in position and prevented from slipping. The greater the tension upon the grip from the pull of the rope, the tighter the grip will bind upon the rope, as will be readily understood, so that slipping of the grip under all conditions will be avoided. When the tension upon the grip is relaxed by slacking the connection 6, the grip may be freely adjusted along the rope to any desired position. Hence it will be seen that the invention provides a grip of simple form which will firmly secure the connecting member to the rope without the use of clamping or fastening means of any kind.

Having thus described the invention, what is claimed as new, is:—

1. A rope grip comprising a pair of end loops located in parallel planes, one loop being shorter than the other and each loop having a closed end and an open end, and obliquely-arranged arms connecting the open ends of the loops, the latter extending in the same direction from said arms.

2. A rope grip comprising loops of unequal length, the ends of the loops being connected by obliquely arranged arms, a ring or link slidably engaging said arms, and a connecting member attached to said ring or loop.

In testimony whereof, I affix my signature in presence of witnesses.

RAYMOND E. PATTERSON.

Witnesses:
 MORRIS L. STERN,
 GERTRUDE HEBERLING,
 JOSEPH P. HOGAN.